(12) United States Patent
Park et al.

(10) Patent No.: US 8,712,957 B2
(45) Date of Patent: Apr. 29, 2014

(54) METHOD, APPARATUS, AND SYSTEM FOR SYNCHRONIZING CONTENTS

(75) Inventors: Joo-hyoun Park, Suwon-si (KR); Dae-il Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 598 days.

(21) Appl. No.: 12/575,719

(22) Filed: Oct. 8, 2009

(65) Prior Publication Data

US 2010/0161553 A1 Jun. 24, 2010

(30) Foreign Application Priority Data

Dec. 19, 2008 (KR) .................. 10-2008-0130535

(51) Int. Cl.
*G06F 17/30* (2006.01)
(52) U.S. Cl.
USPC ........................................... 707/610
(58) Field of Classification Search
None
See application file for complete search history.

(56) References Cited

U.S. PATENT DOCUMENTS

2008/0109492 A1* 5/2008 Koo ........................ 707/200
2008/0208920 A1* 8/2008 Stirbu et al. ............. 707/201

FOREIGN PATENT DOCUMENTS

| EP | 1650627 A2 | 4/2006 |
| WO | 2004/008460 A1 | 1/2004 |
| WO | 2004/023487 A1 | 3/2004 |
| WO | 2009/090194 A1 | 7/2009 |

OTHER PUBLICATIONS

Apple Inc.: "iPod nano Features Guide" Internet Citation, 2006, XP002439057; Retrieved from the Internet: URL:http://manuals.info.apple.com/en/iPod_nano_Features_Guide.pdf> retrieved on Jun. 22, 2007.
Extended European Search Report dated Feb. 25, 2010, issued in counterpart Application No. 09173824.5-2223.

* cited by examiner

*Primary Examiner* — Belix M Ortiz Ditren
(74) *Attorney, Agent, or Firm* — Sughrue Mion, PLLC (57) ABSTRACT

A method, apparatus and system for synchronizing contents are provided. The method for synchronizing contents includes comparing contents stored in a first device with a content list stored in a second device, and deleting contents from the content list or adding contents to the content list. Therefore, is possible to prevent incorrect contents from being browsed even when contents are not completely synchronized.

30 Claims, 12 Drawing Sheets

USB

| Contents | Capacity |
|---|---|
| A | 1M |
| B | 2M |
| C | 1M |
| D | 100M |
| E | 2M |

DTV

| Contents | Capacity |
|---|---|
| A | 1M |
| E | 1M |
| B | 2M |

| Contents | Capacity |
|---|---|
| A | 1M |
| E | 1M |
| E' | 2M |
| B | 2M |

| Contents | Capacity |
|---|---|
| A | 1M |
| E | 1M |
| E' | 2M |
| B | 2M |
| C | 1M |

DTV

| Contents | Addition time | Playback status | Capacity | ⋮ |
|---|---|---|---|---|
| A | A | A | F | ⋮ |
| B | E | E | E | ⋮ |
| C | B | C | C | ⋮ |
| E | C | F | B | ⋮ |
| F | F | B | A | ⋮ |

# METHOD, APPARATUS, AND SYSTEM FOR SYNCHRONIZING CONTENTS

CROSS-REFERENCE TO RELATED APPLICATION

This application claims priority from Korean Patent Application No. 10-2008-0130535, filed on Dec. 19, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to synchronizing contents, and more particularly, to synchronizing contents between a content playback device and a content storage device.

2. Description of the Related Art

Portable storage devices such as universal serial buses (USBs) have become widespread. Portable storage devices may store contents such as photographs, moving images or music, so users can enjoy desired contents anytime, anywhere by connecting USBs to content playback devices. Content playback devices comprise memories for storing contents and may play back contents.

However, when a user desires to play back contents stored in a storage device to enjoy the contents, he or she needs to perform a synchronization process, for example individually moving contents stored in the storage device and deleting a content which is completely played back from a playback device, which causes inconveniences to the user.

Accordingly, a method is provided to perform the synchronization process automatically when a storage device is connected to a playback device. However, if the synchronization process is automatically performed, a deletion synchronization process requiring a relatively small amount of time and an addition synchronization process requiring a large amount of time may be performed in an order of a content list. Accordingly, contents to be deleted from the playback device may be browsed and contents to be added may not be added so as not to be browsed.

Additionally, when the content list in the playback device needs to be displayed before the synchronization process is completed, contents that have already been completely deleted from the playback device may be displayed on the content list, or currently displayed contents may need to be deleted from the content list. Therefore, a user may be provided with incorrect content information, and thus a likelihood of confusion may arise.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provides a method, apparatus and system for synchronizing contents between a playback device which plays back contents and a storage device which stores contents, in order to prevent incorrect contents from being browsed when synchronization is not completed.

According to an aspect of the present invention, there is provided a method for synchronizing contents, comprising comparing contents stored in a first device with a content list stored in a second device, and extracting at least one first content which is contained in the content list but not stored in the first device; deleting the first content from the content list; and adding to the content list at least one second content which is stored in the first device but not contained in the content list, if the deleting is completed.

The adding may comprise extracting the second content if the deleting is completed; and adding the second content to the content list.

The comparing may comprise comparing the contents stored in the first device with the content list and extracting the first content along with the second content.

The method may further comprise arranging the content list if the second content is added.

The arranging may comprise arranging the content list based on at least one selected from a group consisting of: information regarding a content title, content creation time, content addition time, type of contents, content playback status, content preference and content deletion prevention setting.

The comparing may comprise sequentially comparing the contents stored in the first device with the content list.

The comparing may comprise comparing the contents stored in the first device with the content list based on an arrangement of contents contained in the content list.

The method may further comprise determining whether or not the first device is connected to the second device. Contents may be synchronized automatically if it is determined that first device is connected to the second device.

According to another aspect of the present invention, there is provided a method for synchronizing contents, comprising deleting contents in a first group from a content list stored in a second device based on contents stored in a first device; and adding contents in a second group to the content list stored in the second device if the deleting is completed.

The contents in the first group may be stored in the first device but may not be contained in the content list, and the contents in the second group may be contained in the content list but may not be stored in the first device.

According to another aspect of the present invention, there is provided a content playback apparatus which performs content synchronization with an external device, the content playback apparatus comprising a storage unit which stores a content list; and a synchronization controller which compares the content list with contents stored in the external device, extracts at least one first content which is contained in the content list but not stored in the external device, deletes the first content from the content list, and adds to the content list at least one second content which is stored in the external device but not contained in the content list if the deleting is completed.

The synchronization controller may extract the second content and add the second content to the content list, if the deleting is completed.

The synchronization controller may compare the contents stored in the external device with the content list and extract the first content along with the second content.

The content playback apparatus may further comprise a content arrangement unit which arranges the content list if the second content is added.

The content arrangement unit may arrange the content list based on at least one selected from a group consisting of: information regarding a content title, content creation time, content addition time, type of contents, content playback status, content preference and content deletion prevention setting.

The synchronization controller may sequentially compare the contents stored in the external device with the content list.

The synchronization controller may compare the contents stored in the external device with the content list based on an arrangement of contents contained in the content list.

The content playback apparatus may further comprise an interface which is connected to the external device. The synchronization controller may perform synchronization automatically if it is determined that the external device is connected.

According to another aspect of the present invention, there is provided a system for synchronizing contents stored in a first device with contents stored in a second device, the system comprising the first device which transmits a content, which is not contained in a content list stored in the second device, among the stored contents to the second device, if being connected to the second device; and the second device which compares the stored content list with the contents stored in the first device, extracts at least one first content which is contained in the content list but not stored in the first device, deletes the first content from the content list, and adds to the content list at least one second content which is stored in the first device but not contained in the content list if the deleting is completed.

The first device may be a portable storage device, and the second device may be a browsing device for browsing contents contained in the content list.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 1:
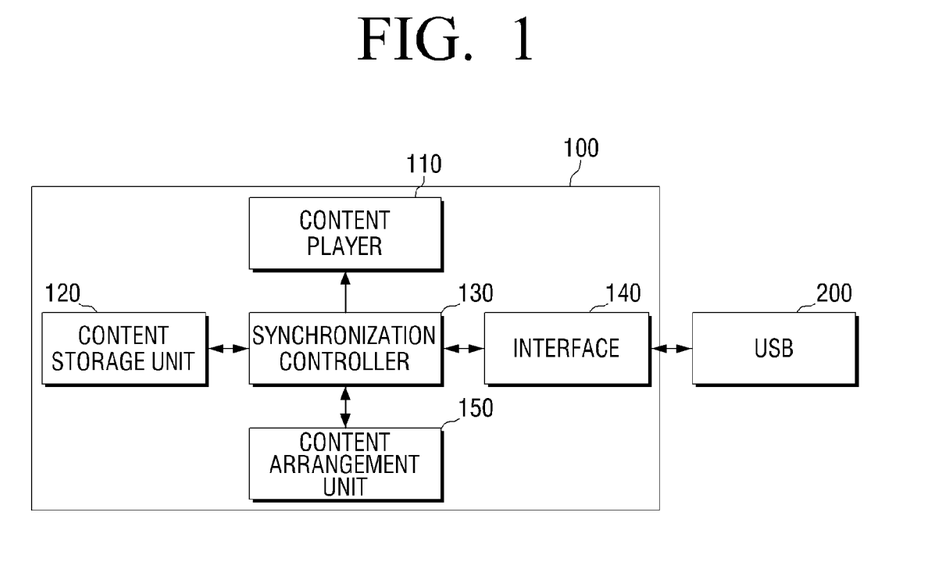
FIG. 1 is a block diagram illustrating a content synchronization system according to an exemplary embodiment of the present invention.

FIG. 1 is a block diagram illustrating a content synchronization system according to an exemplary embodiment of the present invention. The content synchronization system of FIG. 1 comprises a digital television (DTV) 100 and a universal serial bus (USB) 200. The DTV 100 browses contents stored in the USB 200 through content synchronization with the USB 200.

A content synchronization process enables a list of contents stored in the DTV 100 to be identical to a list of contents stored in the USB 200. For example, if contents 'A' and 'B' are stored in the DTV 100 and if contents 'B' and 'C' are stored in the USB 200, the DTV 100 may delete content 'A' from among the stored contents, may receive content 'C' from the USB 200 and may add the received content 'C' to the list, so as to be synchronized with the USB 200. In an exemplary embodiment, the content list includes identifiers of content. Hereinafter, the deleting of content from a content list and the deleting of a content identifier from a content list are used interchangeably. Likewise, the adding of content to a content list and adding of a content identifier to a content list are used interchangeably.

The DTV 100, as a content playback device, plays back broadcast programs or contents received from broadcast stations or external storage devices via wired and/or wireless communication. The DTV 100 synchronizes contents using a digital content management (DCM) method according to the content synchronization process, and displays a list of the synchronized contents on a screen. The DTV 100 is a merely example of a content playback device for playing back contents, and accordingly exemplary embodiments of the present invention are also applicable to any devices capable of playing back contents.

Herein, the content playback device may be not only a device capable of playing back contents in a fixed position such as the DTV 100, but also a device capable of playing back contents while moving such as a portable multimedia player (PMP). Additionally, the USB 200 refers to a storage device for storing multimedia contents.

As shown in FIG. 1, the DTV 100 comprises a content player 110, a content storage unit 120, a synchronization controller 130, an interface 140 and a content arrangement unit 150.

The content player 110 may play back contents stored in the content storage unit 120 that will be described below, or may receive contents stored in an external storage medium such as the USB 200 and play back the received contents. The content player 110 may decompress compressed contents in the content storage unit 120, and may play back contents from the last playback position using information regarding the playback status which is contained in metadata of the contents.

The content storage unit 120 stores contents and a content list. Herein, the content list refers to content database (DB) comprising contents arranged based on information regarding the content title, content creation time, content addition time, type of contents, content playback status, content preference and content deletion prevention setting. The content storage unit 120 may be a non-volatile memory such as a flash memory.

The interface 140 functions as an USB connector to perform communication with the USB 200. The interface 140 receives contents stored in the USB 200 or information regarding contents stored in the USB 200 from the USB 200. In the exemplary embodiment of the present invention, the interface 140 is an USB connector to connect the DTV 100 with the USB 200, but there is no limitation to the USB connector. Accordingly, exemplary embodiments of the present invention are also applicable to a situation in which the interface 140 is a connector or a communication module for wired and/or wireless communication such as an IEEE1394, Bluetooth and wireless fidelity (WiFi) in order to communicate with external storage devices other than the USB 200.

The content arrangement unit 150 arranges contents stored in the content storage unit 120. In more detail, if the information regarding the content title, content creation time, content addition time, type of contents, content playback status, content preference and content deletion prevention setting is extracted from the metadata contained in the contents, the content arrangement unit 150 may arrange a content list stored in the content storage unit 120 according to at least one of the information described above.

The synchronization controller 130 controls overall operations of the DTV 100 associated with content synchronization. The synchronization controller 130 controls the content player 110 and content storage unit 120, to play back a content stored in the content storage unit 120 and to add information on the playback status of the content that is completely played back to metadata in the content.

Additionally, the synchronization controller 130 controls the content arrangement unit 150 to arrange the content list stored in the content storage unit 120.

The synchronization controller 130 also controls the interface 140 to receive contents stored in the USB 200 or information regarding the contents stored in the USB 200 from the USB 200. In more detail, after receiving the contents stored in the USB 200 or information regarding the contents from the USB 200 via the interface 140, the synchronization controller 130 compares the contents stored in the USB 200 with the content list stored in the content storage unit 120, so as to perform content synchronization.

The synchronization controller 130 deletes a content, which is not stored in the USB 200 but is contained in the content list stored in the content storage unit 120, from the content storage unit 120, receives a content, which is stored in the USB 200 but is not contained in the content list, from the USB 200, and stores the received content in the content storage unit 120 to add the stored content to the content list.

Figure 2:
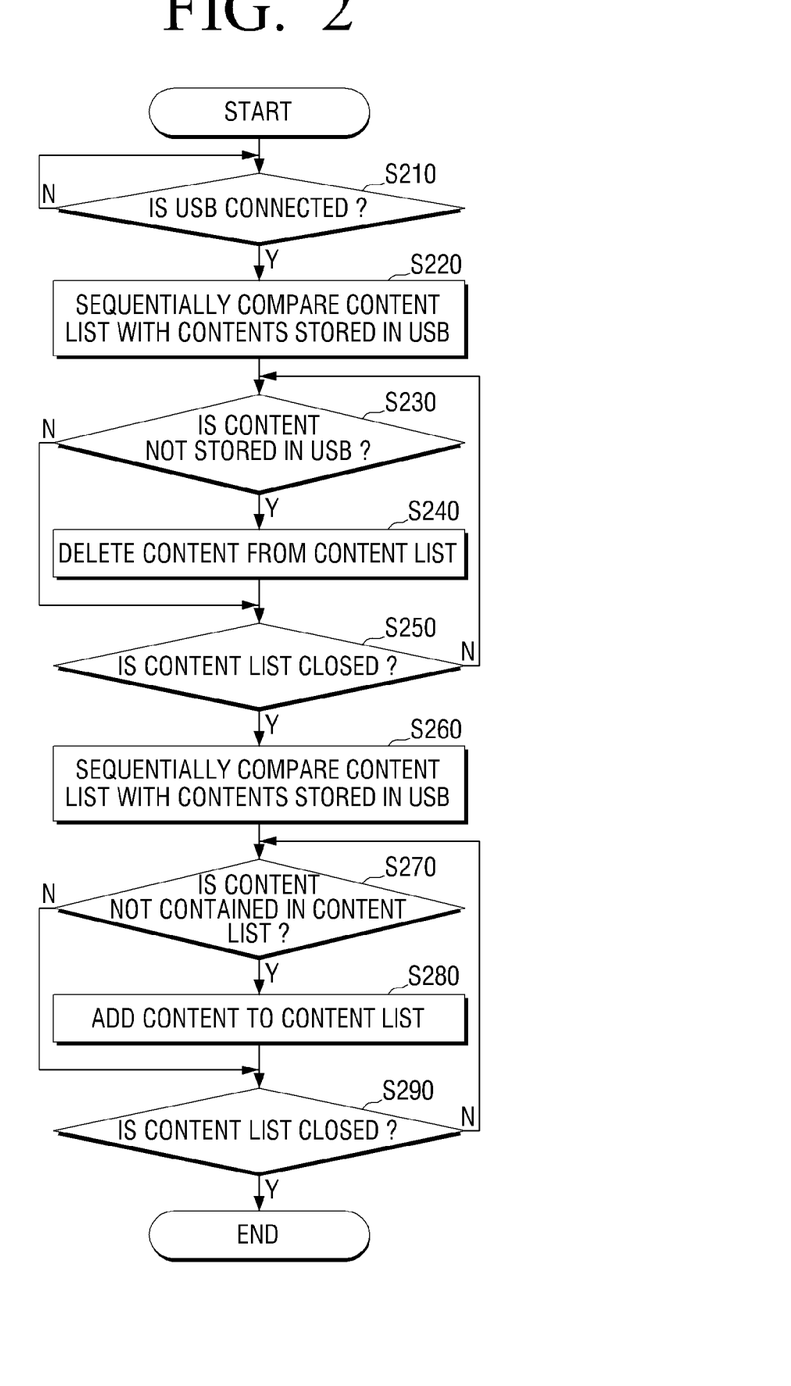
FIG. 2 is a flowchart explaining a content synchronization method according to an exemplary embodiment of the present invention.

The content synchronization is now described in detail with reference to FIGS. 2 to 4. FIG. 2 is a flowchart explaining a content synchronization method according to an exemplary embodiment of the present invention.

The synchronization controller 130 determines whether or not the DTV 100 is connected to the USB 200 via the interface 140 (S210). If it is determined that the DTV 100 is connected to the USB 200 (S210-Y), the synchronization controller 130 sequentially compares the content list stored in the content storage unit 120 with contents stored in the USB 200 (S220).

In operation S220, the content list stored in the content storage unit 120 may be compared with the contents stored in the USB 200 according to the order of contents arranged in the content list, that is, in a descending priority order of arrangement.

Subsequently, the synchronization controller 130 determines whether or not there is a content which is contained in the content list but not stored in the USB 200 (S230).

If the content contained in the content list but not stored in the USB 200 is found (S230-Y), the synchronization controller 130 deletes the content from the content list and the content storage unit 120 (S240).

The synchronization controller 130 determines whether or not the content list is closed (S250). If it is determined that the content list is not closed (S250-N), the synchronization controller 130 repeats operations S230 and S240. Herein, the closing of the content list refers that comparison of contents is completed.

Hereinafter, a content deletion operation is now described in detail with reference to FIG. 3.

Figure 3:
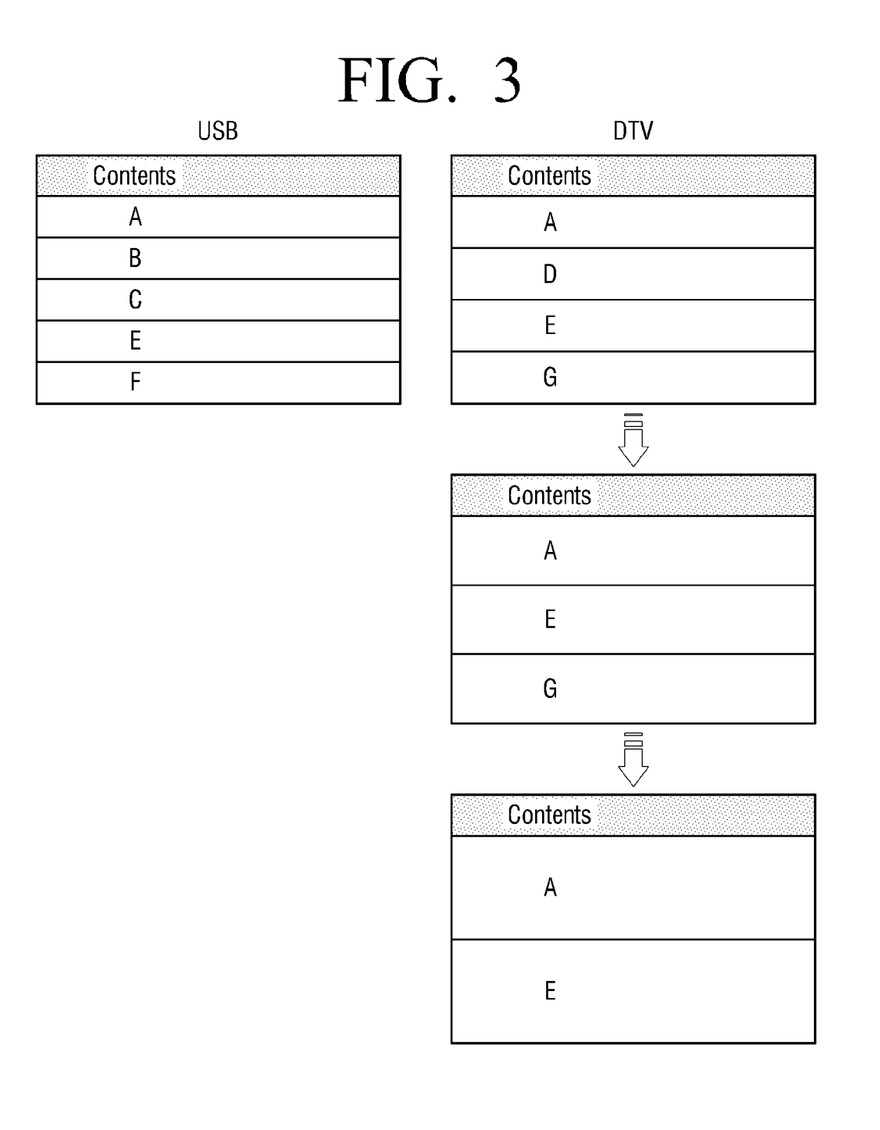
FIG. 3 is a view explaining a content deletion operation.

In FIG. 3, contents 'A', 'B', 'C', 'E' and 'F' are stored in the USB 200, and contents 'A', 'D', 'E' and 'G' are stored in the DTV 100. In this situation, the DTV 100 may search for and delete contents which are contained in the content list stored in the content storage unit 120 but not stored in the USB 200 in sequence.

The DTV 100 searches for and deletes content 'D', and then searches for and deletes content 'G', as shown in FIG. 3.

Referring back to FIG. 2, upon determining that the content list is closed (S250-Y), the synchronization controller 130 recompares the content list stored in the content storage unit 120 with contents stored in the USB 200 in the descending priority order of arrangement (S260).

Next, the synchronization controller 130 determines whether or not there is a content which is stored in the USB 200 but not contained in the content list (S270).

If the content which is stored in the USB 200 but not contained in the content list is found (S270-Y), the synchronization controller 130 adds the content to the content list, and stores the content in the content storage unit 120 (S280).

The synchronization controller 130 then determines whether or not the content list is closed (S290). If it is determined that the content list is not closed (S290-N), the synchronization controller 130 repeats operations S270 and S280.

Hereinafter, a content addition operation is now described in detail with reference to FIG. 4.

Figure 4:
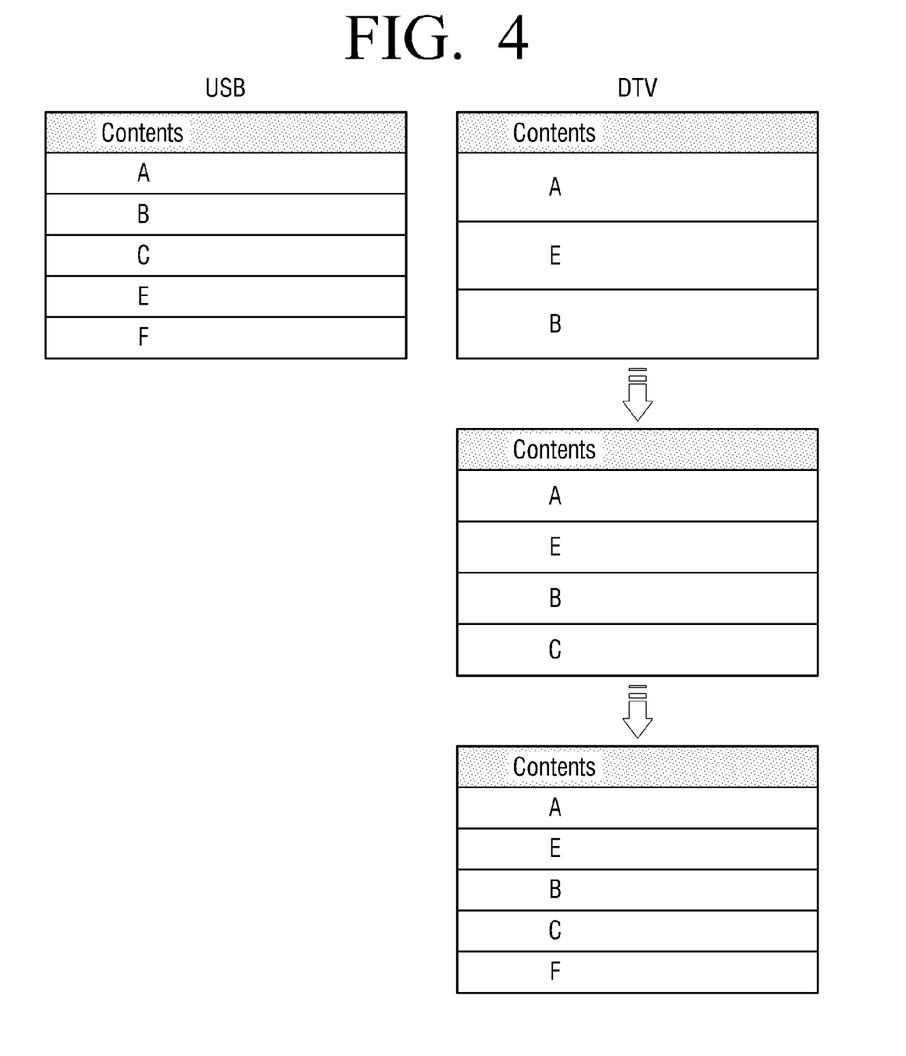
FIG. 4 is a view explaining a content addition operation.

In FIG. 4, contents 'A', 'B', 'C', 'E' and 'F' are stored in the USB 200, and only contents 'A' and 'E' are stored in the DTV 100 after contents 'D' and 'G' are deleted from the DTV 100. In this situation, the DTV 100 may search for and add contents which are not contained in the content list stored in the content storage unit 120 but are stored in the USB 200 in sequence.

As shown in FIG. 4, the DTV 100 searches for and adds contents 'B', 'C' and 'F' in sequence.

As described above, the content list is compared twice with the contents stored in the USB 200, and the content deletion operation and the content addition operation are sequentially performed, so it is possible to synchronize contents more rapidly and accurately.

While all contents, which are contained in the content list stored in the content storage unit 120 but not stored in the USB 200, are deleted from the content storage unit 120 in the exemplary embodiment of the present invention, there is no limitation thereto. Accordingly, exemplary embodiments of the present invention are also applicable to a situation in which contents specified by a user are not deleted. This situation is now described in detail with reference to FIGS. 5 and 6.

Figure 5:
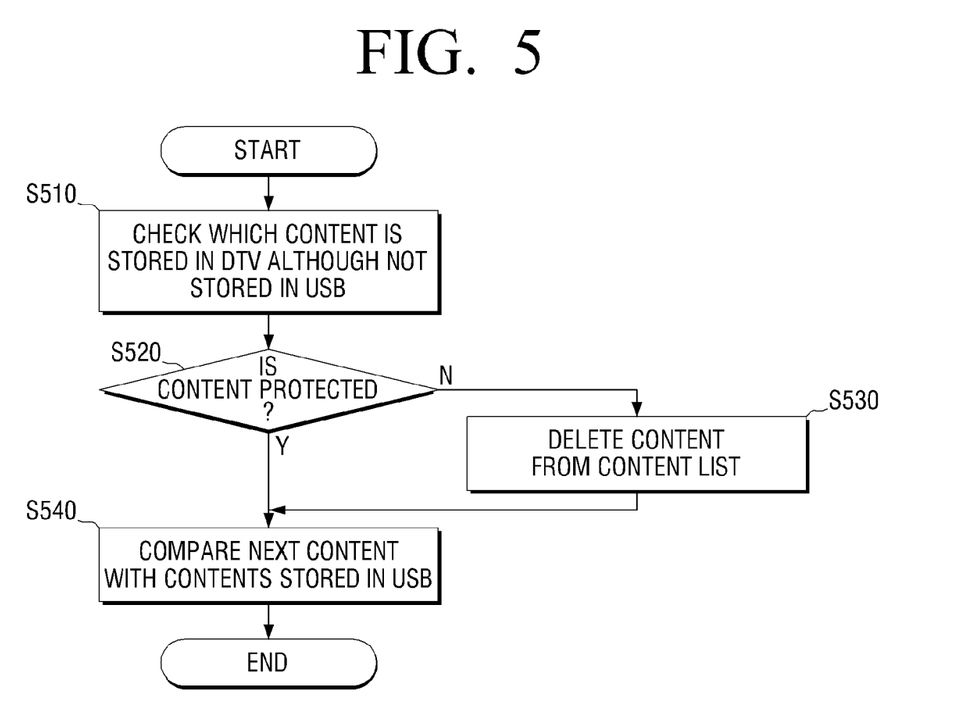
FIG. 5 is a flowchart explaining a content deletion synchronization process performed taking into consideration contents set to be protected.

FIG. 5 is a flowchart explaining a content deletion synchronization process performed taking into consideration contents set to be protected. The synchronization controller 130 checks which content is stored in the DTV 100 but not stored in the USB 200 in the same manner as operation S230-Y (S510).

Subsequently, the synchronization controller 130 determines whether or not the content is protected so as not to be deleted (S520). Upon determining that the content is protected (S520-Y), the synchronization controller 130 compares the next content with contents stored in the USB 200 rather than deleting the protected content (S540). Alternatively, upon determining that the content is unprotected (S520-N), the synchronization controller 130 deletes the unprotected content (S530), and compares the next content with contents stored in the USB 200 (S540).

Figure 6:
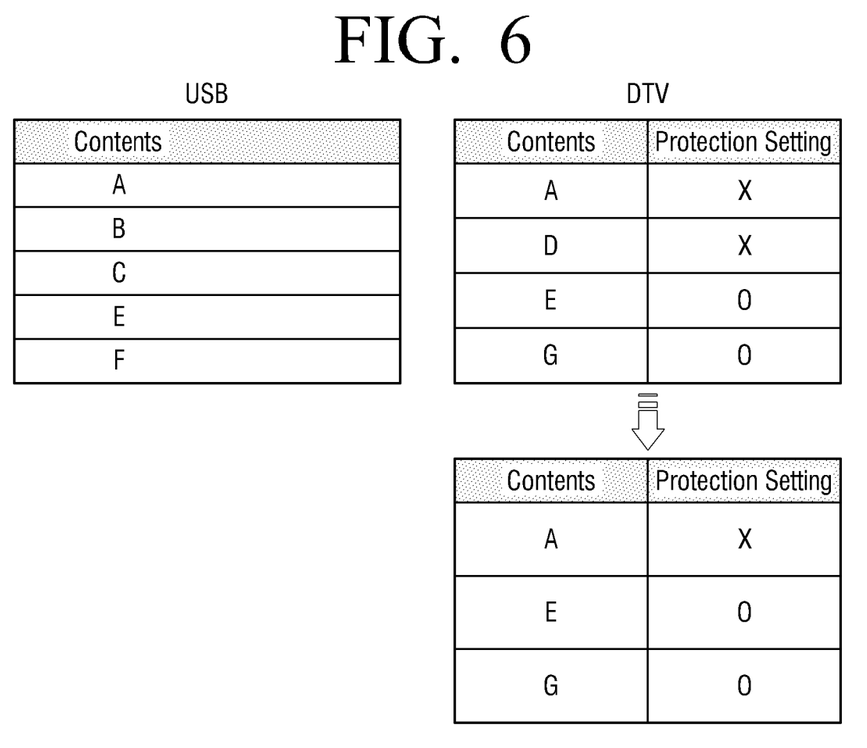
FIG. 6 is a view explaining a content deletion operation performed taking into consideration contents set to be protected.

FIG. 6 is a view explaining a content deletion operation performed taking into consideration contents set to be protected. In FIG. 6, the synchronization controller 130 determines which content is set to be protected among contents in the content list. Whether or not contents are set to be protected may be determined based on information contained in metadata in contents.

As shown in FIG. 6, the DTV 100 deletes unprotected content 'D' but does not delete protected content 'G'.

Therefore, it is possible to synchronizing contents taking into consideration user convenience. Additionally, only contents which a user desires to collect may be protected.

While contents stored in both the USB 200 and the content list of the content storage unit 120 are not deleted or added in the exemplary embodiment of the present invention, there is no limitation thereto. Accordingly, exemplary embodiments of the present invention are also applicable to a situation in which a user adds some contents to the content list according to criteria set by the user.

Additionally, all contents, which are stored in the USB 200 but not contained in the content list of the content storage unit 120, are added to the content storage unit 120 in the exemplary embodiment of the present invention, there is no limitation thereto. Accordingly, exemplary embodiments of the present invention are also applicable to a situation in which contents specified by a user are added.

Figure 7:
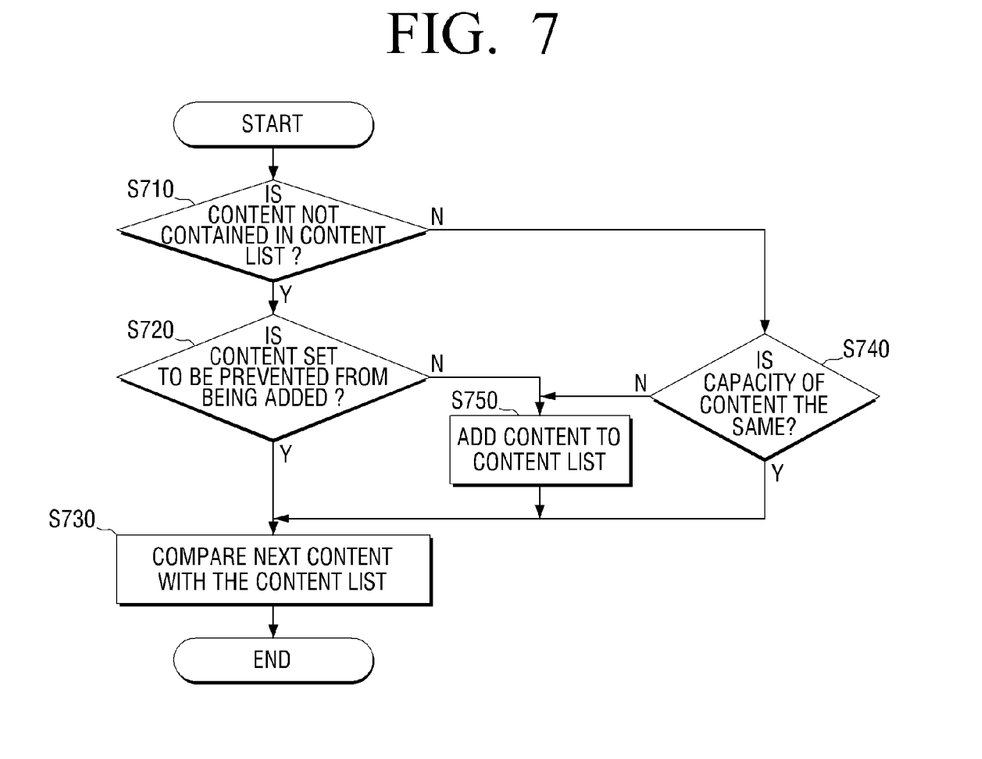
FIG. 7 is a flowchart explaining a content addition synchronization process performed taking into consideration contents set to be prevented from being added or to be separately added.

The two situations to which exemplary embodiments of the present invention are applicable are now described with reference to FIGS. 7 and 8. FIG. 7 is a flowchart explaining a content addition synchronization process performed taking into consideration contents set to be prevented from being added or to be separately added. The synchronization controller 130 determines whether or not there is a content which is stored in the USB 200 but not contained in the content list in the same manner as operation S270 (S710).

If the content which is stored in the USB 200 but not contained in the content list is found (S710-Y), the synchronization controller 130 determines whether or not the content is set to be prevented from being added (S720).

If it is determined that the content is set to be prevented from being added (S720-Y), the synchronization controller 130 compares the next content with the content list rather than adding the content prevented from being added (S730). Alternatively, upon determining that the content is set to be unprevented from being added (S720-N), the synchronization controller 130 adds the unprevented content to the content list (S750), and compares the next content with the content list (S730).

If it is determined that there is a content contained in both the content list and the USB 200 (S710-N), the synchronization controller 130 determines whether or not the content is set to be separately added (S740).

In the exemplary embodiment of the present invention, contents with the same title but different capacities may be set to be separately added. For example, if a content contained in the content list and a content stored in the USB 200 have the same title but different capacities (S710-N, S740-N), the synchronization controller 130 adds the content in USB 200 to the content list (S750), and then compares the next content with the content list (S730).

Figure 8:
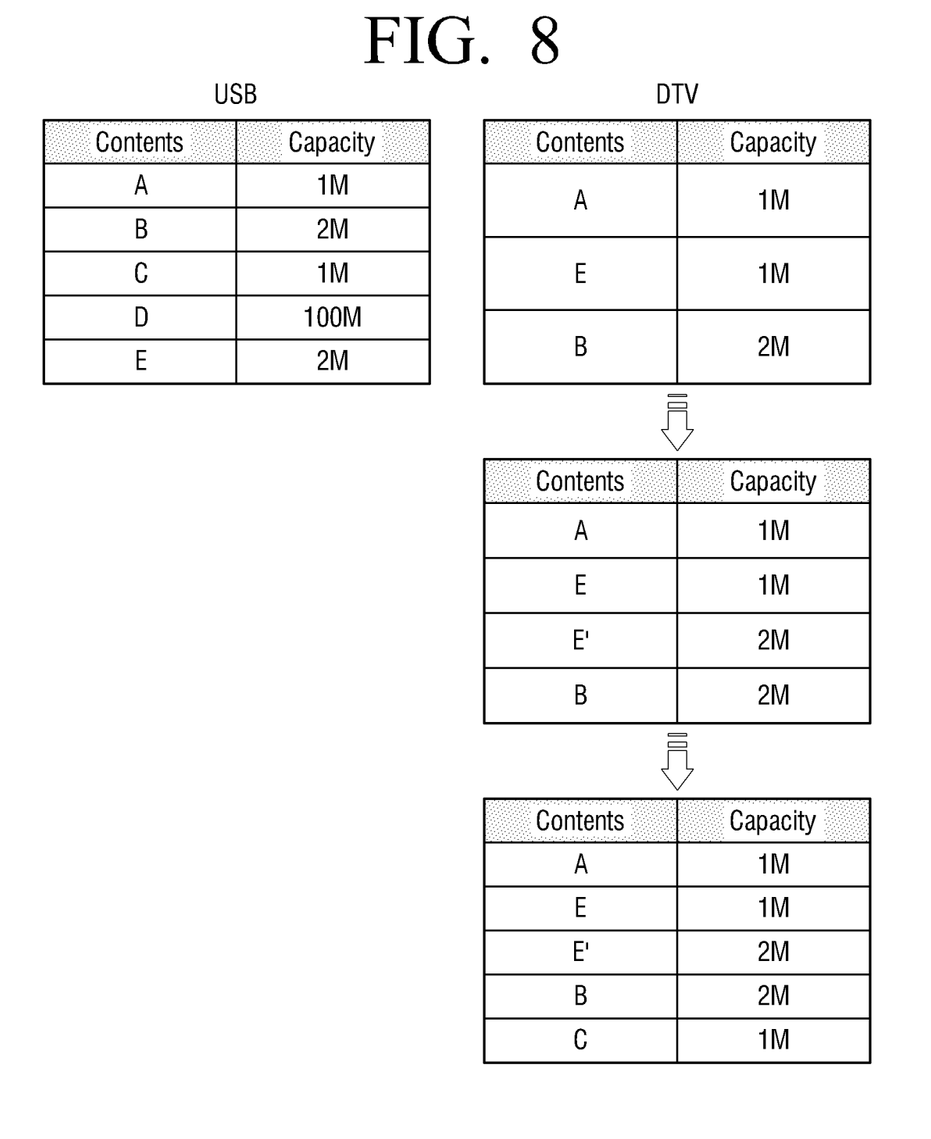
FIG. 8 is a view explaining a content addition operation performed taking into consideration contents set to be prevented from being added or to be separately added.

FIG. 8 is a view explaining a content addition operation performed taking into consideration contents set to be prevented from being added or to be separately added. The synchronization controller 130 determines which content is set to be prevented from being added or to be separately added among contents in the content list, based on information contained in metadata in contents.

In the exemplary embodiment of the present invention, contents with a capacity equal to or greater than about 50 megabytes (MB) may be set to be prevented from being added, and contents with the same title but different capacities may be set to be separately added.

The DTV 100 needs to add content 'D' which is stored in the USB 200 but not contained in the content list stored in the DTV 100. However, since content 'D' has a capacity equal to or greater than about 50 MB, the DTV 100 is not permitted to add content 'D'.

Additionally, the DTV 100 is unable to add content 'E' which is stored in both the USB 200 and the content list of the DTV 100 in principle. However, content 'E' contained in the content list has a capacity of about 1 MB, and content 'E' stored in the USB 200 has a capacity of about 2 MB, and it is thus possible for the DTV 100 to separately add content 'E' in USB 200 to the content list.

In this situation, to prevent a user from confusing content 'E' contained in the content list with content 'E' added to the content list, the title of content 'E' added to the content list may be changed to 'E' and content 'E' may be stored in the content list. Additionally, content 'E' in the USB 200 may also be changed to 'E'.

Therefore, it is possible to synchronize contents taking into consideration user convenience. The title of contents may be mainly changed when the DTV 100 has a small storage capacity, or when a user fails to receive desired contents due to the titles of contents that are the same by user mistakes.

While the addition synchronization process is started after the deletion synchronization process is completed in the exemplary embodiment of the present invention, there is no limitation thereto. Accordingly, exemplary embodiments of the present invention are also applicable to a situation in which the addition synchronization process is ready to be started during the deletion synchronization process. Hereinafter, a process of previously selecting contents during the deletion synchronization process in order to perform the addition synchronization process is now described in detail with reference to FIGS. 9 and 10.

Figure 9:
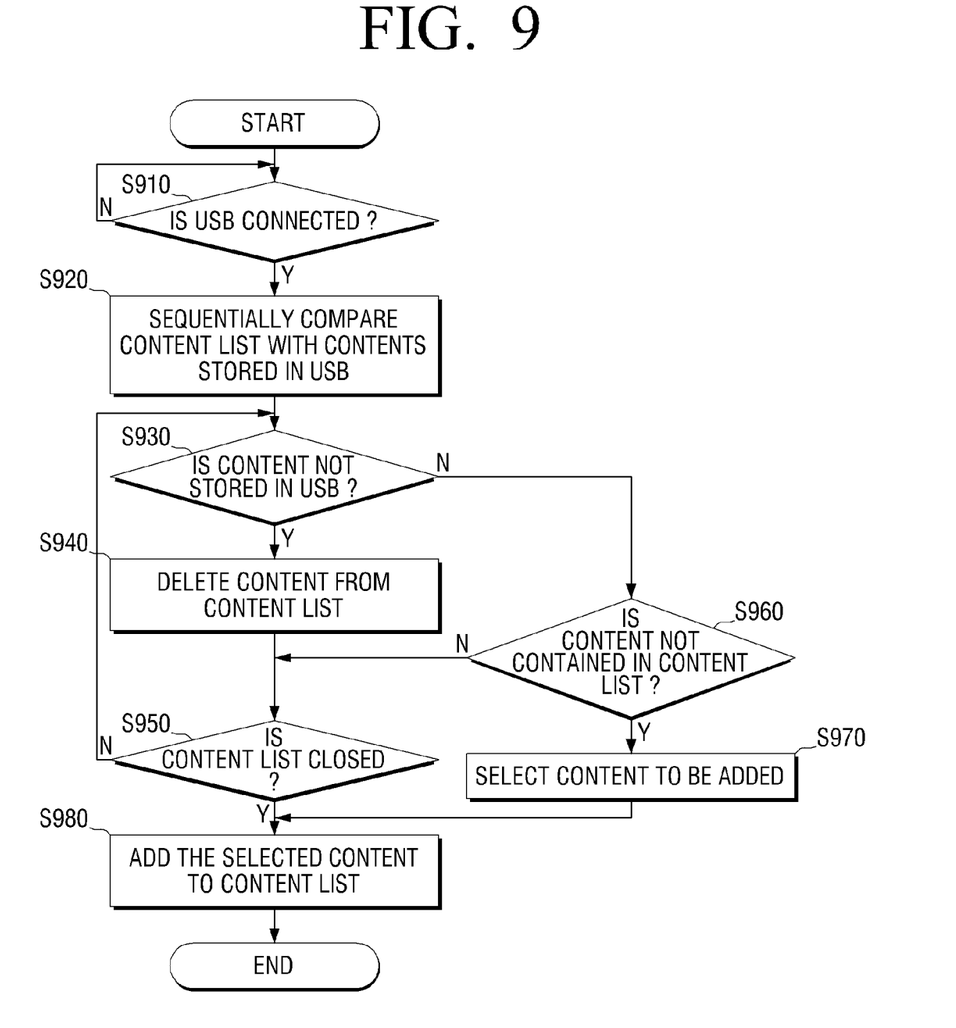
FIG. 9 is a flowchart explaining a content synchronization method according to another exemplary embodiment of the present invention.

FIG. 9 is a flowchart explaining a content synchronization method according to another exemplary embodiment of the present invention. In FIG. 9, the synchronization controller 130 determines whether or not the DTV 100 is connected to the USB 200 via the interface 140 (S910). If it is determined that the DTV 100 is connected to the USB 200 (S910-Y), the synchronization controller 130 sequentially compares the content list stored in the content storage unit 120 with contents stored in the USB 200 (S920).

In operation S920, the content list stored in the content storage unit 120 may be compared with the contents stored in the USB 200 according to the order of contents arranged in the content list, that is, in a descending priority order of arrangement.

Subsequently, the synchronization controller 130 determines whether or not there is a content which is contained in the content list but not stored in the USB 200 (S930).

If the content contained in the content list but not stored in the USB 200 is found (S930-Y), the synchronization controller 130 deletes the content from the content list and the content storage unit 120 (S940).

If it is determined that the content contained in the content list is stored in the USB 200 (S930-N), the synchronization controller 130 determines whether or not there is a content which is stored in the USB 200 but not contained in the content list (S960). If the content which is stored in the USB 200 but not contained in the content list is found (S960-Y), the synchronization controller 130 selects the content to be added (S970).

Herein, operation S970 refers that contents to be added are previously selected prior to the addition synchronization process.

Subsequently, the synchronization controller 130 determines whether or not the content list is closed (S950). If it is determined that the content list is not closed (S950-N), the synchronization controller 130 repeats operations S930, S940, S960 and S970.

If it is determined that the content list is closed (S950-Y), the synchronization controller 130 adds the selected content to the content list and stores the added content in the content storage unit 120 while monitoring the content list (S980).

Hereinafter, a situation in which the addition synchronization process is partially performed during the deletion synchronization process is now described in detail with reference to FIG. 10.

Figure 10:
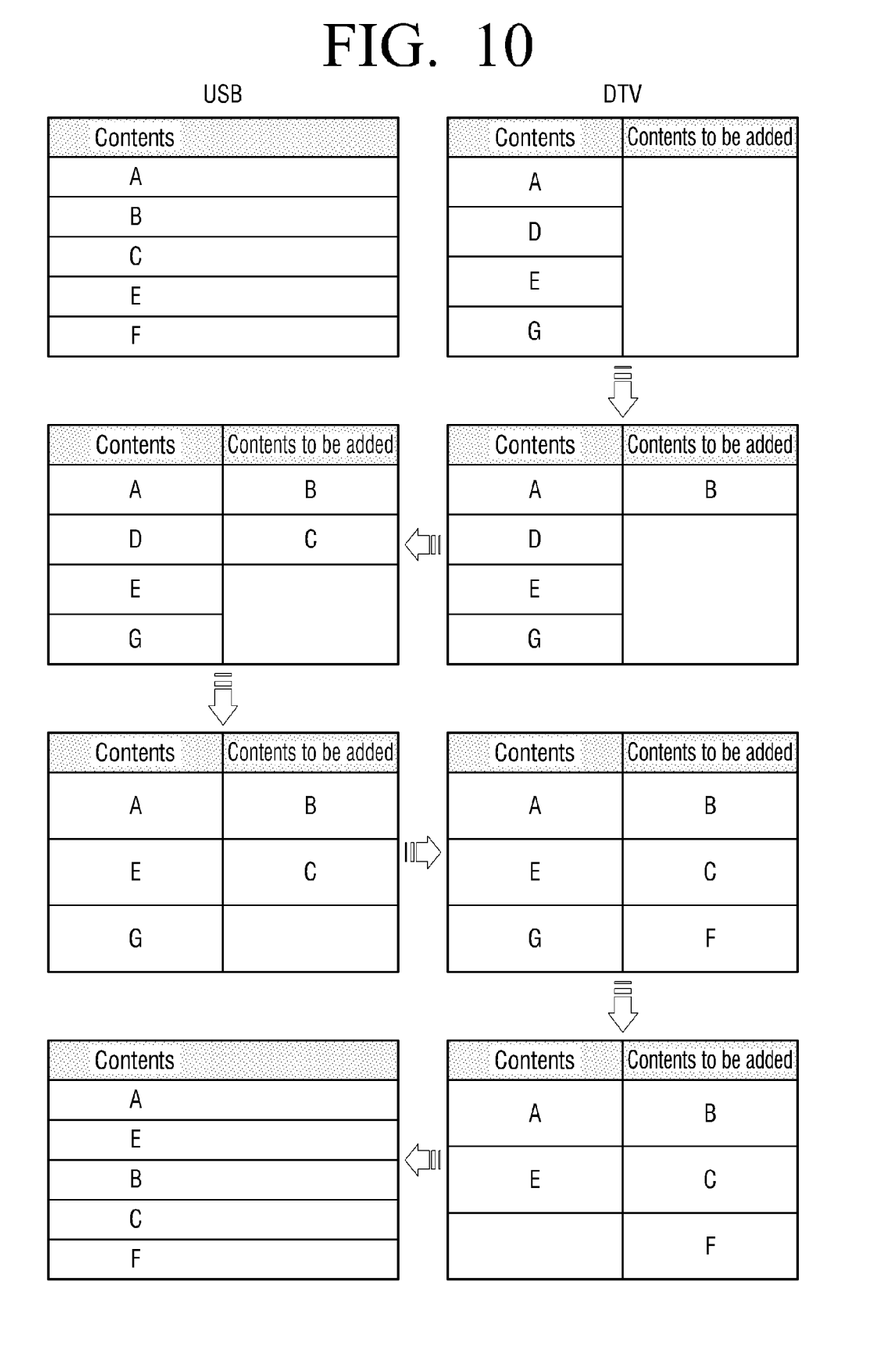
FIG. 10 is a view explaining an addition synchronization process partially performed during a deletion synchronization process.

In FIG. 10, the DTV 100 prepares for the addition synchronization process during the deletion synchronization process while sequentially comparing contents in the content list stored in the content storage unit 120 with contents stored in the USB 200. During the deletion synchronization process shown in FIG. 10, the DTV 100 first checks contents to be added, and prepares for the addition synchronization process by changing information contained in metadata in contents.

As shown in FIG. 10, the DTV 100 performs the deletion synchronization process and addition synchronization preparatory process by checking contents 'B', 'C' for addition, deleting content 'D', checking content 'F' for addition and deleting content 'G' in sequence. After the deletion synchronization process and addition synchronization preparatory process are completed, the DTV 100 adds checked contents 'B', 'C' and 'F' to the content list.

Therefore, it is also possible to synchronize contents more rapidly and accurately.

As described above, the content arrangement unit 150 arranges the content list stored in the content storage unit 120 according to at least one of the information regarding the content title, content creation time, content addition time, type of contents, content playback status, content preference and content deletion prevention setting. The arrangement of the content list is now described with reference to FIGS. 11 and 12.

Figure 11:
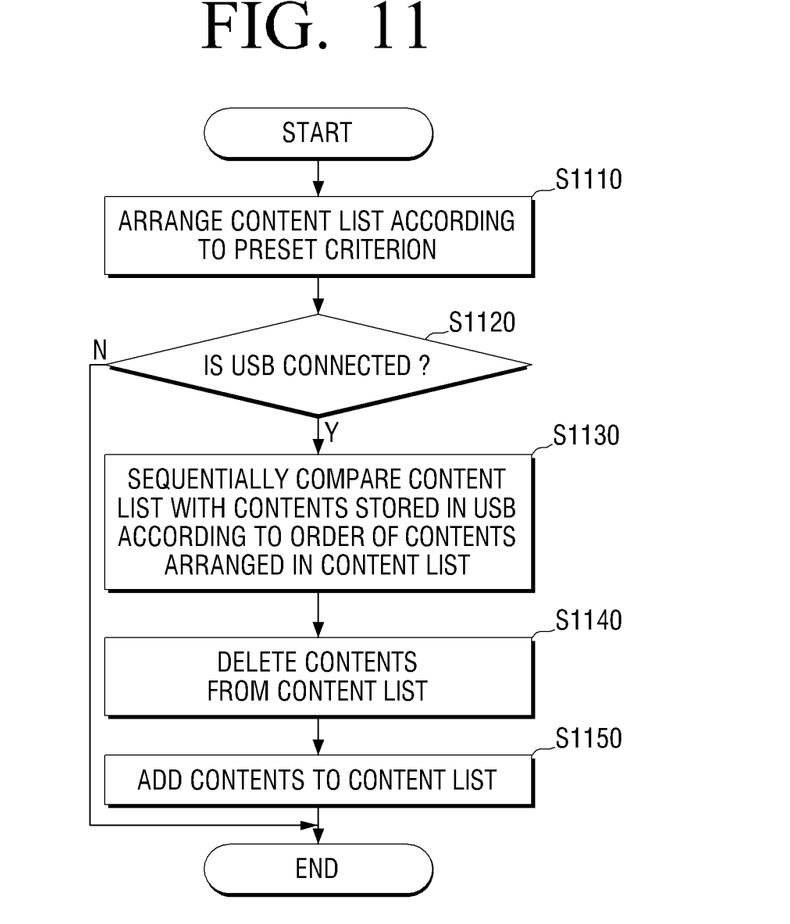
FIG. 11 is a flowchart explaining a process of arranging a content list and synchronizing contents.

FIG. 11 is a flowchart explaining a process of arranging a content list and synchronizing contents. The content arrangement unit 150 arranges the content list according to a preset criterion (S1110). Herein, the preset criterion may be one of the information regarding the content title, content creation time, content addition time, type of contents, content playback status, content preference and content deletion prevention setting, as described above.

The synchronization controller 130 determines whether or not the DTV 100 is connected to the USB 200 via the interface 140 (S1120). If it is determined that the DTV 100 is connected to the USB 200 (S1120-Y), the synchronization controller 130 compares the content list stored in the content storage unit 120 with contents stored in the USB 200 according to the order of contents arranged in the content list (S1130).

Subsequently, the synchronization controller 130 deletes contents from the content list through above-described operations S230 to S250 or S510 to S540 (S1140).

After operation S1140 is completed, the synchronization controller 130 adds contents to the content list through above-described operations S260 to S280 or S710 to S750 (S1150).

Therefore, it is possible to synchronize contents in the order of contents arranged according to user settings.

Figure 12:
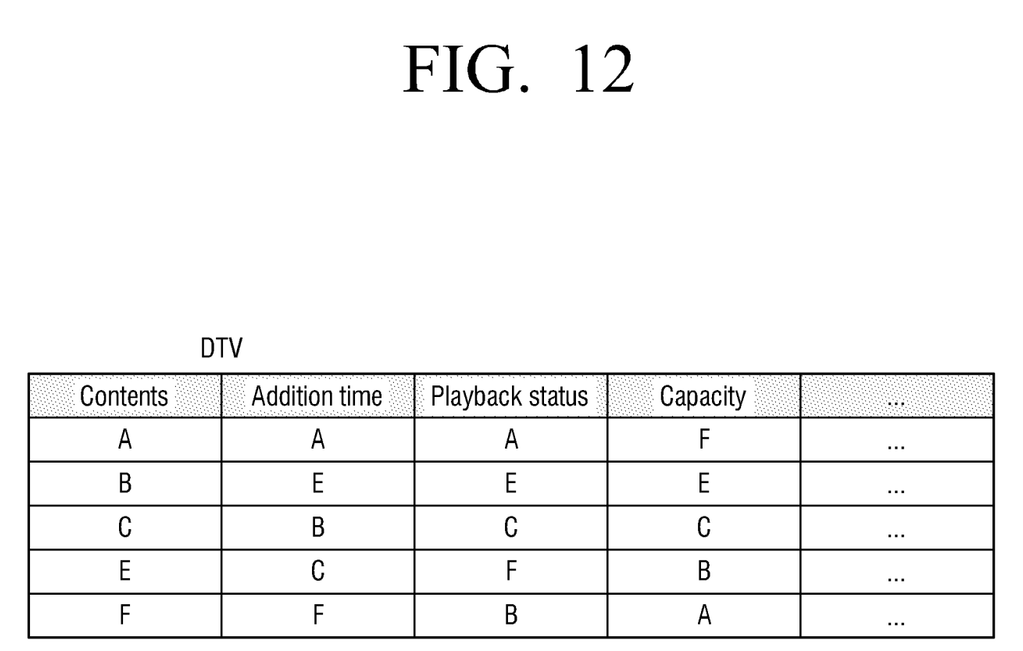
FIG. 12 is a view illustrating a content list arranged according to user settings.

FIG. 12 is a view illustrating a content list arranged according to user settings. In FIG. 12, contents may be arranged according to the title, addition time, playback status, capacity or other criteria.

If contents are arranged according to the title, contents may seem to be in good order. If contents are arranged according to the addition time, it is possible to determine whether or not to delete contents that have been added for a long time, thereby efficiently synchronizing contents.

Alternatively, if contents are arranged according to the playback status, a user may determine whether or not to delete contents that have been played back frequently. Additionally, if contents are arranged according to the capacity, a content with the largest capacity may be added after other contents are added, to efficiently synchronize contents.

The title, addition time, playback status and capacity are exemplary for convenience of description. Accordingly, exemplary embodiments of the present invention are also applicable to a situation in which the content list is arranged according to criteria other than described above.

While contents are synchronized through two processes, namely a process of deleting contents from the content list and a process of adding contents to the content list, this is merely an example for convenience of description. Accordingly, exemplary embodiments of the present invention are also applicable to exemplary embodiments other than the above-described exemplary embodiment if the process of deleting contents is performed first.

For example, if a content synchronization algorithm other than that described in the exemplary embodiment of the present invention has been already employed by the content playback device, exemplary embodiments of the present invention are also applicable to a situation in which the deletion synchronization algorithm according to the exemplary embodiment of the present invention is applied as a preprocess algorithm. In this situation, the same effects as the present invention may be obtained.

Therefore, there is no need to individually perform a synchronization process between contents stored in a storage device with a content list stored in a playback device. Additionally, it is possible to prevent incorrect contents from being browsed even when contents automatically are synchronized.

The foregoing exemplary embodiments and advantages are merely exemplary and are not to be construed as limiting exemplary embodiments of the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for synchronizing contents, comprising:
comparing contents stored in a first device with a content list stored in a second device, and determining at least one first content which is in the content list but not stored in the first device;
deleting the first content from the content list;
comparing contents stored in the first device with the content list from which the first content has been deleted, and determining at least one second content which is stored in the first device but not in the content list from which the first content has been deleted; and
adding the at least one second content to the content list from which the first content has been deleted,
wherein the deleting step is performed before the adding step.

2. The method as claimed in claim 1, wherein the deleting comprises deleting a part of one of the at least one first content first if a user enters a command to access one of the at least one first content.

3. The method as claimed in claim 1, wherein the deleting comprises blocking a user command to access one of the at least one first content which is received before the deleting is completed.

4. The method as claimed in claim 1, wherein the adding comprises:
extracting the at least one second content if the deleting is completed; and
adding the at least one second content to the content list.

5. The method as claimed in claim 1, wherein the comparing comprises comparing the contents stored in the first device with the content list, determining the at least one first content and extracting the at least one second content.

6. The method as claimed in claim 1, further comprising:
arranging the content list if the at least one second content is added to the content list.

7. The method as claimed in claim 6, wherein the arranging comprises arranging the content list based on at least one selected from a group consisting of: information regarding a content title, content creation time, content addition time, type of contents, content playback status, content preference and content deletion prevention setting.

8. The method as claimed in claim 1, wherein the comparing comprises sequentially comparing the contents stored in the first device with the content list.

9. The method as claimed in claim 8, wherein the comparing comprises comparing the contents stored in the first device with the content list based on an arrangement of contents in the content list.

10. The method as claimed in claim 1, further comprising:
determining whether or not the first device is connected to the second device,
wherein the contents stored in the first device and the content list stored in the second device are synchronized automatically if it is determined that first device is connected to the second device.

11. The method as claimed in claim 1, further comprising:
displaying the content list stored in the second device if it is determined that first device is connected to the second device,
wherein the deleting comprises deleting the at least one first content from the displayed content list, and the adding comprises adding the at least one second content to the displayed content list from which the at least one first content is deleted.

12. A method for synchronizing contents, comprising:
deleting contents in a first group from a content list stored in a second device based on contents stored in a first device;
comparing contents stored in a first device with the content list from which the first content has been deleted, and determining a second group which is stored in the first device but not in the content list from which the first content has been deleted; and
adding contents in the second group to the content list from which the first content has been deleted,
wherein the deleting step is performed before the adding step.

13. The method as claimed in claim 12, wherein the contents in the first group are stored in the first device but are not in the content list, and the contents in the second group are in the content list but are not stored in the first device.

14. A content playback apparatus which performs content synchronization with an external device, the content playback apparatus comprising:
a storage unit which stores a content list; and
a synchronization controller which compares the content list with contents stored in the external device, determines at least one first content which is in the content list but not stored in the external device, deletes the at least one first content from the content list, compares the content list from which the first content has been deleted with the contents stored in the external device, determines at least one second content which is stored in the first device but not in the content list from which the first content has been deleted, and adds the at least one second content to the content list from which the first content has been deleted,
wherein the synchronization controller performs the deleting before the adding.

15. The content playback apparatus as claimed in claim 14, wherein the synchronization controller deletes a part of one of the at least one first content first if a user enters a command to access the first content.

16. The content playback apparatus as claimed in claim 14, wherein the synchronization controller blocks a user command to access one of the at least one first content which is received before the deleting of the one of the at least one first content from the content list is completed.

17. The content playback apparatus as claimed in claim 14, wherein the synchronization controller extracts the at least one second content and adds the at least one second content to the content list, if the deleting of the at least one first content from the content list is completed.

18. The content playback apparatus as claimed in claim 14, wherein the synchronization controller compares the contents stored in the external device with the content list, determines the at least one first content, and extracts the at least one second content.

19. The content playback apparatus as claimed in claim 14, further comprising:
a content arrangement unit which arranges the content list if the at least one second content is added to the content list.

20. The content playback apparatus as claimed in claim 19, wherein the content arrangement unit arranges the content list based on at least one selected from a group consisting of: information regarding a content title, content creation time, content addition time, type of contents, content playback status, content preference and content deletion prevention setting.

21. The content playback apparatus as claimed in claim 14, wherein the synchronization controller sequentially compares the contents stored in the external device with the content list.

22. The content playback apparatus as claimed in claim 21, wherein the synchronization controller compares the contents stored in the external device with the content list based on an arrangement of contents in the content list.

23. The content playback apparatus as claimed in claim 14, further comprising:
   an interface which is operable to be connected to the external device,
   wherein the synchronization controller performs synchronization automatically if it is determined that the external device is connected.

24. The content playback apparatus as claimed in claim 23, wherein, if it is determined that the external device is connected, the synchronization controller displays the content list stored in the storage unit, deletes the at least one first content from the displayed content list, and adds the at least one second content to the displayed content list from which the at least one first content is deleted.

25. A system for synchronizing contents stored in a first device with contents stored in a second device, the system comprising:
   the first device which transmits a content, which is not in a content list stored in the second device, among the stored contents to the second device, if the first device is connected to the second device; and
   the second device which compares the stored content list with the contents stored in the first device, determines at least one first content which is in the content list but not stored in the first device, deletes the at least one first content from the content list, compares contents stored in the first device with the content list from which the first content has been deleted, determines at least one second content which is stored in the first device but not in the content list from which the first content has been deleted, and adds the at least one second content to the content list from which the first content has been deleted,
   wherein the second device performs the deleting before the adding.

26. The system as claimed in claim 25, wherein the first device is a portable storage device, and the second device is a browsing device for browsing contents in the content list.

27. A method for having same contents in a first device and a second device, the method comprising:
   establishing a communication between a first device including a content list, to a second device storing second device contents; and
   automatically synchronizing the second device contents with the content list of the first device when the communication is established, the synchronizing comprising:
      comparing the second device contents with the content list, and determining a first content which is in the content list but not stored in the second device;
      deleting an identifier of the first content from the content list;
      comparing the second device contents with the content list from which the first content has been deleted, and determining at least one second content which is stored in the second device but not in the content list from which the first content has been deleted; and
      adding the determined at least one second content to the first device,
      wherein the deleting is performed before the adding.

28. The method of claim 27, wherein the synchronizing further comprises:
   determining the one of the second device contents to be added to the first device, by comparing the second device contents and the content list; and
   deleting an identifier of another first content from the content list if the another first content is not stored in the second device;
   wherein the synchronizing is performed in an order of deleting the identifier of the one first content, determining the one of the second device contents to be added to the first device; deleting the identifier of the other first content; and adding the one of the second device contents to the first device.

29. A method of synchronizing contents between a first device and a second device, the method comprising:
   deleting identifiers of first contents from a content list of the first device, not being stored in the second device;
   determining second contents stored in the second device, that are not in the content list of the first device; and
   adding the second contents to the first device,
   wherein the deleting and the determining are alternatingly performed and after the alternatingly performing of the deleting and the determining is completed, the adding is performed,
   wherein the deleting is performed before the adding.

30. The method as claimed in claim 1, wherein one of the deleting and the adding is performed based on at least one selected from a group consisting of: content creation time, content addition time, type of contents, content preference, and content deletion prevention setting.

* * * * *